Figure 1:
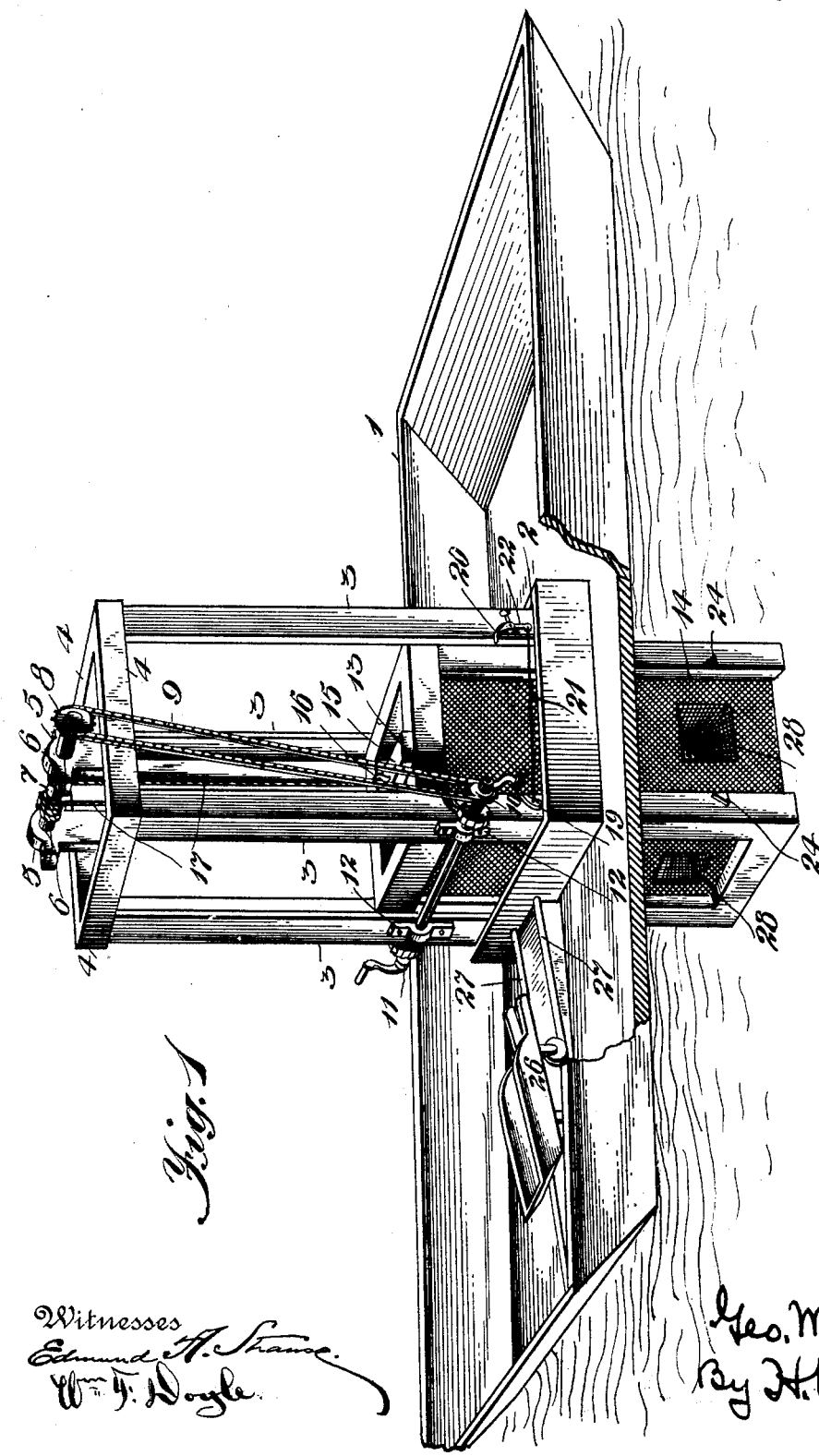

(No Model.) 3 Sheets—Sheet 1.

G. W. NELSON.
COMBINED FISH TRAP AND BOAT.

No. 586,863. Patented July 20, 1897.

Witnesses
Edmund H. Shause
Wm F. Doyle

Inventor
Geo. W. Nelson,
By H. B. Willson,
Attorney

THE NORRIS PETERS CO., PHOTO-LITHO., WASHINGTON, D. C.

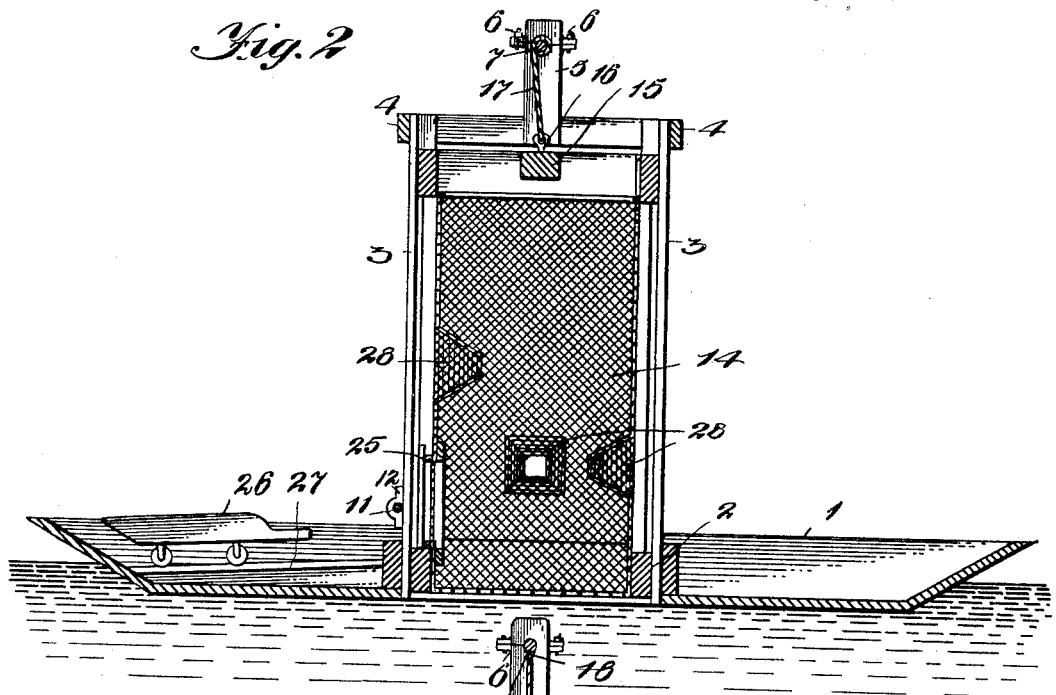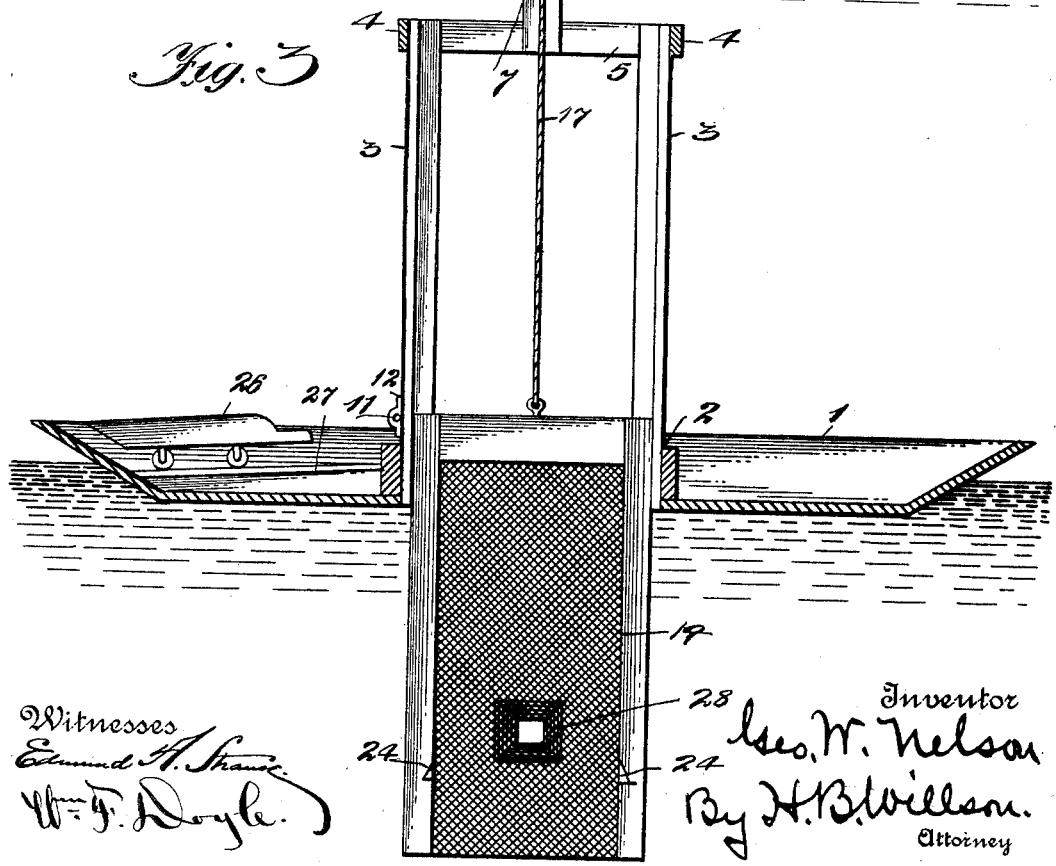

(No Model.)
G. W. NELSON.
COMBINED FISH TRAP AND BOAT.
No. 586,863.
3 Sheets—Sheet 3.
Patented July 20, 1897.
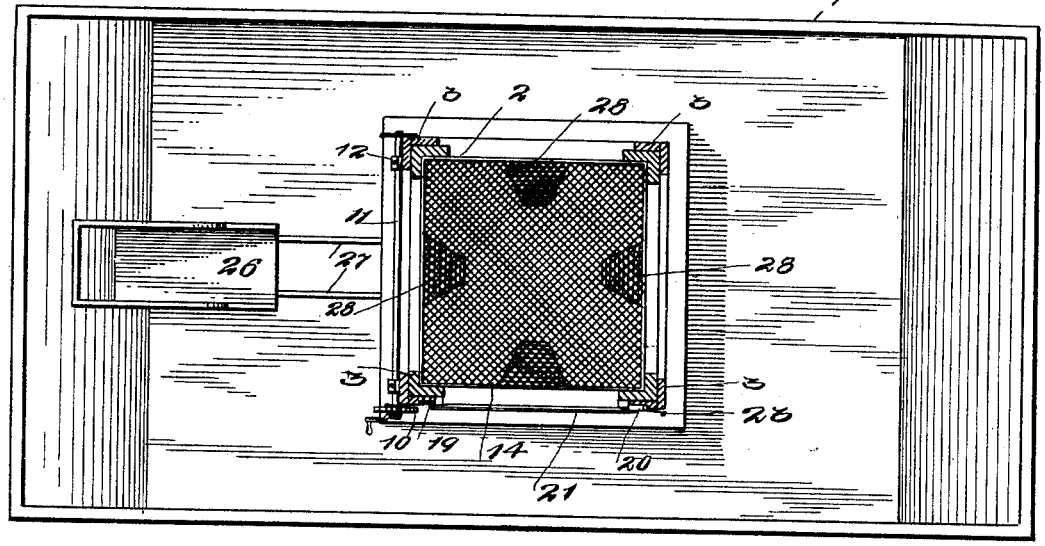
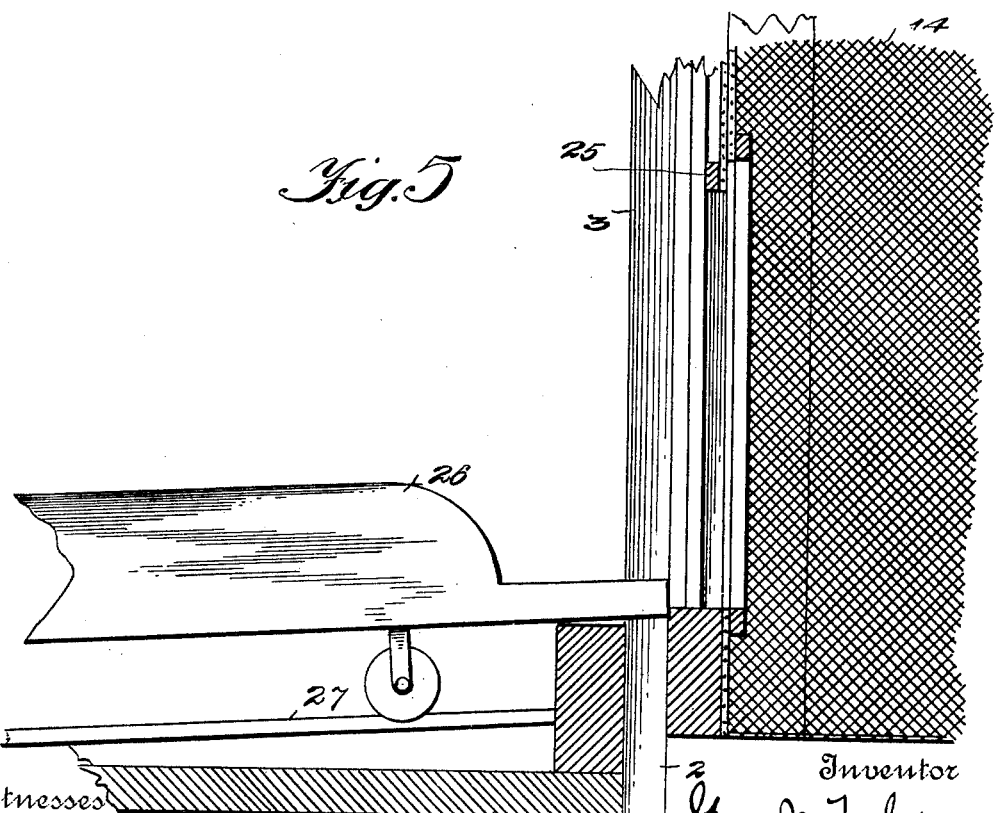

UNITED STATES PATENT OFFICE.

GEORGE W. NELSON, OF FIVE FORKS, PENNSYLVANIA.

COMBINED FISH-TRAP AND BOAT.

SPECIFICATION forming part of Letters Patent No. 586,863, dated July 20, 1897.

Application filed December 10, 1896. Serial No. 615,143. (No model.)

*To all whom it may concern:*

Be it known that I, GEORGE W. NELSON, a citizen of the United States, residing at Five Forks, in the county of Franklin and State of Pennsylvania, have invented certain new and useful Improvements in Fishing-Boats; and I do declare the following to be a full, clear, and exact description of the invention, such as will enable others skilled in the art to which it appertains to make and use the same.

My invention has relation to improvements in floating fish traps or weirs; and the object is to provide a simple and effective device of this class.

To this end the novelty consists in the construction, combination, and arrangement of the several parts of the same, as will be hereinafter more fully described, and particularly pointed out in the claims.

In the accompanying drawings the same reference-numerals indicate the same parts of the invention.

Figure 1 is a perspective view of a floating fish-trap embodying my invention. Fig. 2 is a longitudinal section of the same, showing the cage or pound raised. Fig. 3 is a similar view showing the cage submerged. Fig. 4 is a detail showing the manner of discharging the trapped fish, and Fig. 5 is a horizontal section of the same.

1 represents a suitable scow or pontoon, preferably rectangular in shape and provided with a central rectangular well-hole 2, protected by a vertical gunwale extending around its four sides.

3 3 represent the right-angular guide-standards, provided at their upper ends with the cross and side braces.

4 4 and 5 5 are uprights secured on the inner sides of the opposite side braces, and their upper ends are provided with bearings 6 6, in which is journaled the transverse shaft 7, having a sprocket-wheel 8 fixed on one end, from which an endless sprocket-chain 9 runs to a similar sprocket-wheel 10, secured to one end of a transverse shaft 11, journaled in bearings 12 12, secured to the standards, and this shaft is provided with the usual ratchet-wheel and crank-handles for operating the same. A pawl 13 is pivoted to one of the standards in the path of the ratchet-wheel on the shaft 11.

14 represents a vertical oblong cage, rectangular in cross-section, and its upper end or top is provided with a fixed cross-brace 15, having eyebolts 16 16, from which flexible wire ropes or chains 17 extend to similar eyebolts 18, radially arranged on the shaft 7, and when said shaft is rotated the said cage may be raised or lowered at will.

19 represents a pawl pivoted on one of the standards, and 20 represents a similar pawl pivoted on the same side of the opposite standard. The pawl 19 is connected by a rod 21 to an arm 22 on the pawl 20, so that when its handle 23 is raised or lowered both pawls will be simultaneously thrown in or out to engage or release the detents 24 24 on the cage 14 to support it in an elevated position or allow it to descend and submerge below the level of the water.

25 represents a vertically-sliding door arranged in one end of the case, and 26 represents a car traveling on inclined rails 27 27, which may be pushed up the incline to partly extend under the bottom of the edge of the cage containing the sliding door, so that when the cage is elevated and the car in place, as described, the sliding door may be raised and the contents of the cage discharged into said car, which is then allowed to descend by gravity to the bottom of the vessel.

The sides of the cage are formed of the usual wire-netting or other suitable reticulated material, and they have the usual funnel-shaped openings 28 28 for the easy access of the fish.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

1. A floating fish trap or weir, comprising the vessel 1, provided with the rectangular well-hole 2, the right-angular guide-standards 3 3 connected by the braces 4 4, the uprights 5 5 secured to said braces, the shaft 7 journaled in said uprights and provided with the flexible cords 17 and sprocket-wheel 8, the sprocket-chain 9, the shaft 11, its sprocket and ratchet wheels, pawl and operating-handles, in combination with the rectangular cage 14, the detents 24 24 secured to said cage, and the pawls 19 and 20 pivoted to said standards and connected by the rod 21, substantially as and for the purpose set forth.

2. A floating fish-trap, comprising the vessel 1, provided with the inclined rails 27 and rectangular well-hole 2, the right-angular guide-standards 3 3 connected by the braces 4 4, the uprights 5 5 secured to the said braces, the shaft 7 journaled in said uprights and provided with the screw-eyes and flexible cord, the sprocket-wheel 8, the sprocket-chain 9, the shaft 11, its sprocket-wheel 10, and means for operating the same, in combination with the rectangular cage, the detents 24 secured thereto, the pawls 19 and 20 pivoted to the standards in the path of said detents and connected by the rod 21 and the traveling car 26, substantially as shown and described.

In testimony whereof I hereunto affix my signature in presence of two witnesses.

GEORGE W. NELSON.

Witnesses:
   GEO. E. TERRY,
   A. B. SUIT.